US011885232B2

(12) United States Patent
Nakatani et al.

(10) Patent No.: US 11,885,232 B2
(45) Date of Patent: Jan. 30, 2024

(54) GAS TURBINE SYSTEM AND MOVABLE BODY INCLUDING THE SAME

(71) Applicant: MITSUBISHI HEAVY INDUSTRIES, LTD., Tokyo (JP)

(72) Inventors: Yuichi Nakatani, Tokyo (JP); Yuki Morisaki, Tokyo (JP); Yasuhiro Saiki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/624,965

(22) PCT Filed: Feb. 13, 2020

(86) PCT No.: PCT/JP2020/005608
§ 371 (c)(1),
(2) Date: Jan. 5, 2022

(87) PCT Pub. No.: WO2021/009953
PCT Pub. Date: Jan. 21, 2021

(65) Prior Publication Data
US 2022/0268178 A1 Aug. 25, 2022

(30) Foreign Application Priority Data
Jul. 12, 2019 (JP) ................................ 2019-130169

(51) Int. Cl.
*F01D 25/30* (2006.01)
*B64D 27/24* (2006.01)
(Continued)

(52) U.S. Cl.
CPC ............ *F01D 25/30* (2013.01); *B64D 27/24* (2013.01); *B64D 33/06* (2013.01); *F01D 15/10* (2013.01);
(Continued)

(58) Field of Classification Search
CPC .......... F01D 25/08; F01D 25/10; F01D 25/12; F01D 25/30; F01D 15/10; B64D 27/16;
(Continued)

(56) References Cited

U.S. PATENT DOCUMENTS 2,944,624 A 7/1960 Morley
4,215,536 A * 8/1980 Rudolph ................. F02K 1/386
181/220

(Continued)

FOREIGN PATENT DOCUMENTS

JP 2005-4199 1/2005
JP 2006-205755 8/2006
JP 2008-144764 6/2008

OTHER PUBLICATIONS

International Search Report dated Apr. 21, 2020 in corresponding International (PCT) Patent Application No. PCT/JP2020/005608, with English language translation.
Written Opinion of the International Searching Authority dated Apr. 21, 2020 in corresponding International (PCT) Patent Application No. PCT/JP2020/005608, with English language translation.
(Continued)

*Primary Examiner* — Loren C Edwards
(74) *Attorney, Agent, or Firm* — Wenderoth, Lind & Ponack, L.L.P.

(57) ABSTRACT

A gas turbine system includes: a compressor configured to compress external air to generate compressed air; a combustor configured to burn the compressed air together with fuel to generate a combustion gas; a turbine configured to be driven by the combustion gas; an exhaust unit configured to guide the combustion gas, which has passed through the turbine, to outside; a shell having a cylindrical shape and extending along an axis line about which the turbine is configured to rotate and being arranged so as to cover the compressor, the combustor, the turbine, and the exhaust unit; and an exit unit configured to guide the combustion gas, which has passed through the turbine, to a discharge port in the surface of the shell.

6 Claims, 16 Drawing Sheets

(51) Int. Cl.
  *F01D 15/10* (2006.01)
  *F02C 6/00* (2006.01)
  *F02K 1/34* (2006.01)
  *F02K 1/38* (2006.01)

(52) U.S. Cl.
  CPC .................. *F02C 6/00* (2013.01); *F02K 1/34* (2013.01); *F02K 1/386* (2013.01); *F05D 2220/323* (2013.01); *F05D 2220/76* (2013.01); *F05D 2240/35* (2013.01)

(58) Field of Classification Search
  CPC ........... B64D 27/24; B64D 33/06; F02C 6/00; F02K 1/34; F02K 1/386; F05D 2220/323; F05D 2220/36; F05D 2220/76; F05D 2240/35
  See application file for complete search history.

(56) References Cited

U.S. PATENT DOCUMENTS

| | | | |
|---|---|---|---|
| 5,943,856 | A * | 8/1999 | Lillibridge ................ F02C 7/24 181/220 |
| 5,947,412 | A | 9/1999 | Berman |
| 6,612,106 | B2 | 9/2003 | Balzer |
| 2004/0237502 | A1 | 12/2004 | Moe et al. |
| 2006/0254255 | A1 | 11/2006 | Okai et al. |
| 2008/0134665 | A1 | 6/2008 | Birch et al. |
| 2011/0072781 | A1 | 3/2011 | Birch et al. |
| 2017/0297727 | A1 * | 10/2017 | Niergarth ............... B64D 27/02 |
| 2018/0050806 | A1 | 2/2018 | Kupiszewski et al. |
| 2018/0148187 | A1 | 5/2018 | Valleroy et al. |

OTHER PUBLICATIONS

Office Action dated Sep. 6, 2023 in German Patent Application No. 112020003364.3, with English translation.

* cited by examiner

GAS TURBINE SYSTEM AND MOVABLE BODY INCLUDING THE SAME

TECHNICAL FIELD

The present disclosure relates to a gas turbine system and also relates to a moving body including such a gas turbine system.

BACKGROUND ART

Conventionally, gas turbine engines used for aircrafts and including a compressor unit, a combustor unit, a turbine unit, a rotator that rotates with the turbine unit, and a fan that rotates in response to motion of the rotator to generate thrust have been known (for example, see U.S. Patent Application Publication No. 2018/0050806). The gas turbine engine disclosed in U.S. 2018/0050806 is provided with a generator that rotates with a fan and thereby converts kinetic energy caused by rotation of the fan into electric power. The electric power generated by the generator is used for driving an electric fan or the like arranged at the rear end of an aircraft.

SUMMARY OF INVENTION

Technical Problem

The gas turbine engine disclosed in Patent Literature 1 converts energy of a combustion gas generated by a combustor unit into electric power via a generator that rotates with a turbine unit. However, since a combustion gas that has passed through the turbine unit is directly discharged to outside, it is not possible to effectively utilize a part of thermal energy of the combustion gas. Further, a large difference between the velocity of a high temperature combustion gas and the velocity of an external air may increase mixing noise occurring when the combustion gas and the external air are mixed.

The present disclosure has been made in view of such circumstances, and an object is to provide a gas turbine system that can effectively utilize thermal energy of a combustion gas used in driving of a turbine to reduce mixing noise occurring when a combustion gas and external air are mixed and to provide a moving body including such a gas turbine system.

Solution to Problem

To achieve the above object, a gas turbine system according to the present disclosure includes: a compressor that compresses external air to generate compressed air; a combustor that burns the compressed air generated by the compressor together with fuel to generate a combustion gas; a turbine driven by the combustion gas generated by the combustor; an exhaust unit that guides a combustion gas that passed through the turbine to outside; a shell formed in a cylindrical shape and extending along an axis line about which the turbine rotates and arranged so as to cover the compressor, the combustor, the turbine, and the exhaust unit; and a heat exchange unit that exchanges heat between the combustion gas that passed through the turbine and external air flowing on a surface of the shell.

Advantageous Effects of Invention

According to the present disclosure, it is possible to provide a gas turbine system that can effectively utilize thermal energy of a combustion gas used in driving of a turbine to reduce mixing noise occurring when a combustion gas and external air are mixed and to provide a moving body including such a gas turbine system.

DESCRIPTION OF EMBODIMENTS

First Embodiment

Figure 1:
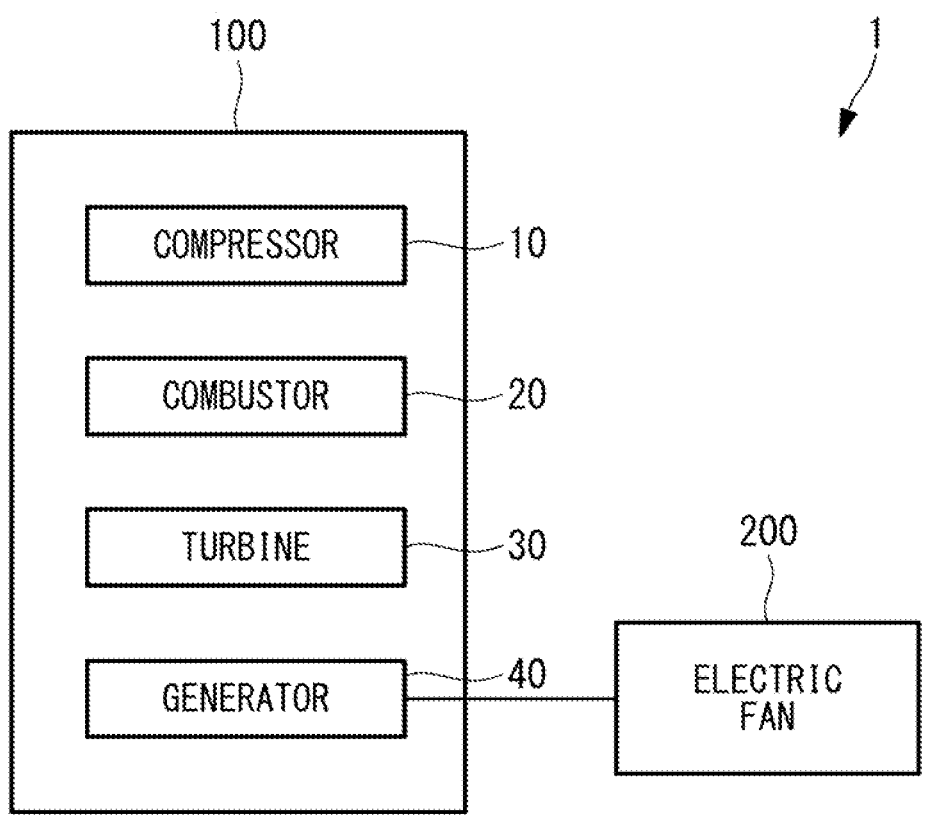
FIG. 1 is a schematic configuration diagram illustrating an aircraft according to a first embodiment of the present disclosure.
Figure 2:
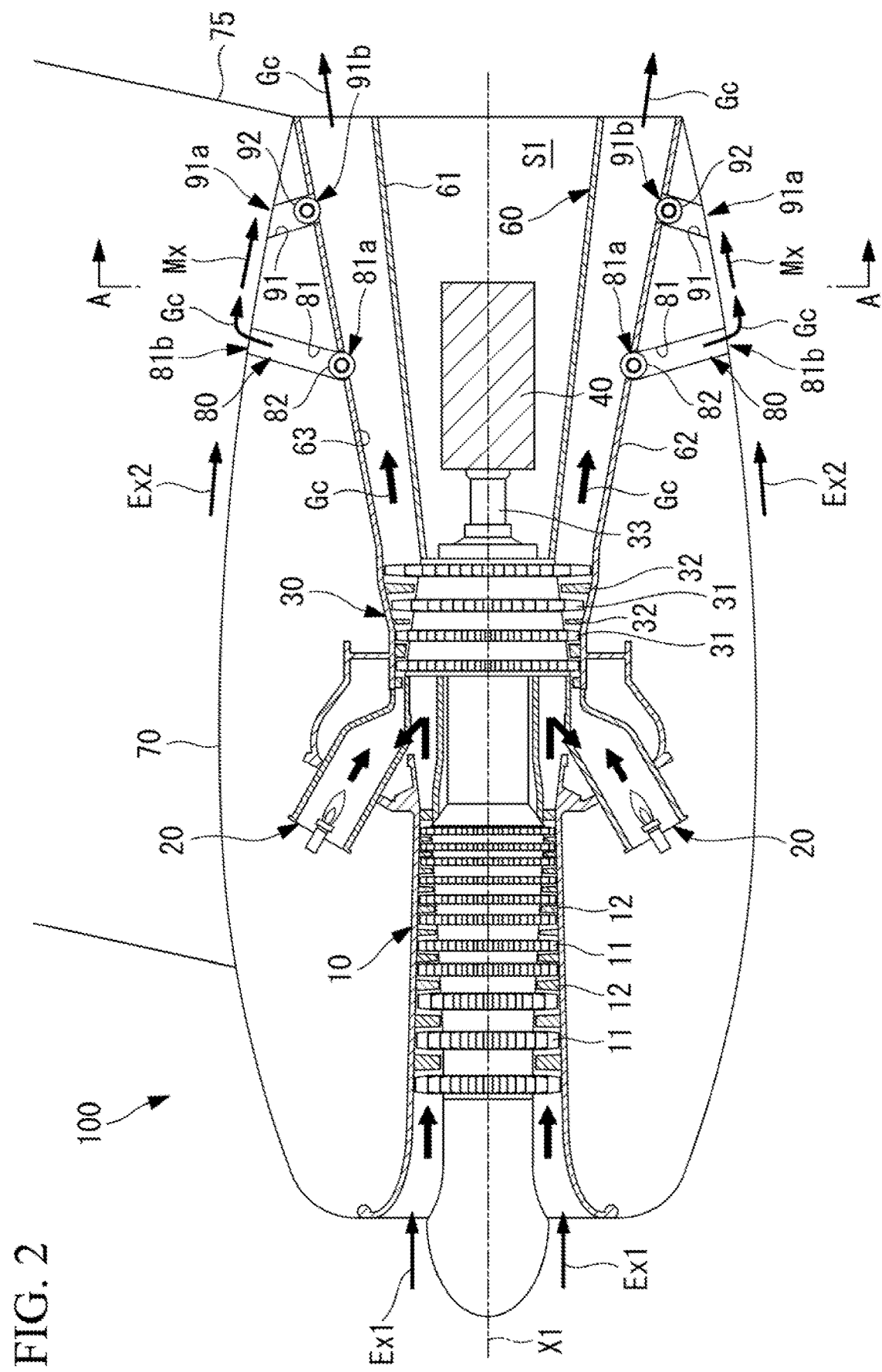
FIG. 2 is a longitudinal sectional view of a gas turbine system illustrated in FIG. 1.
Figure 3:
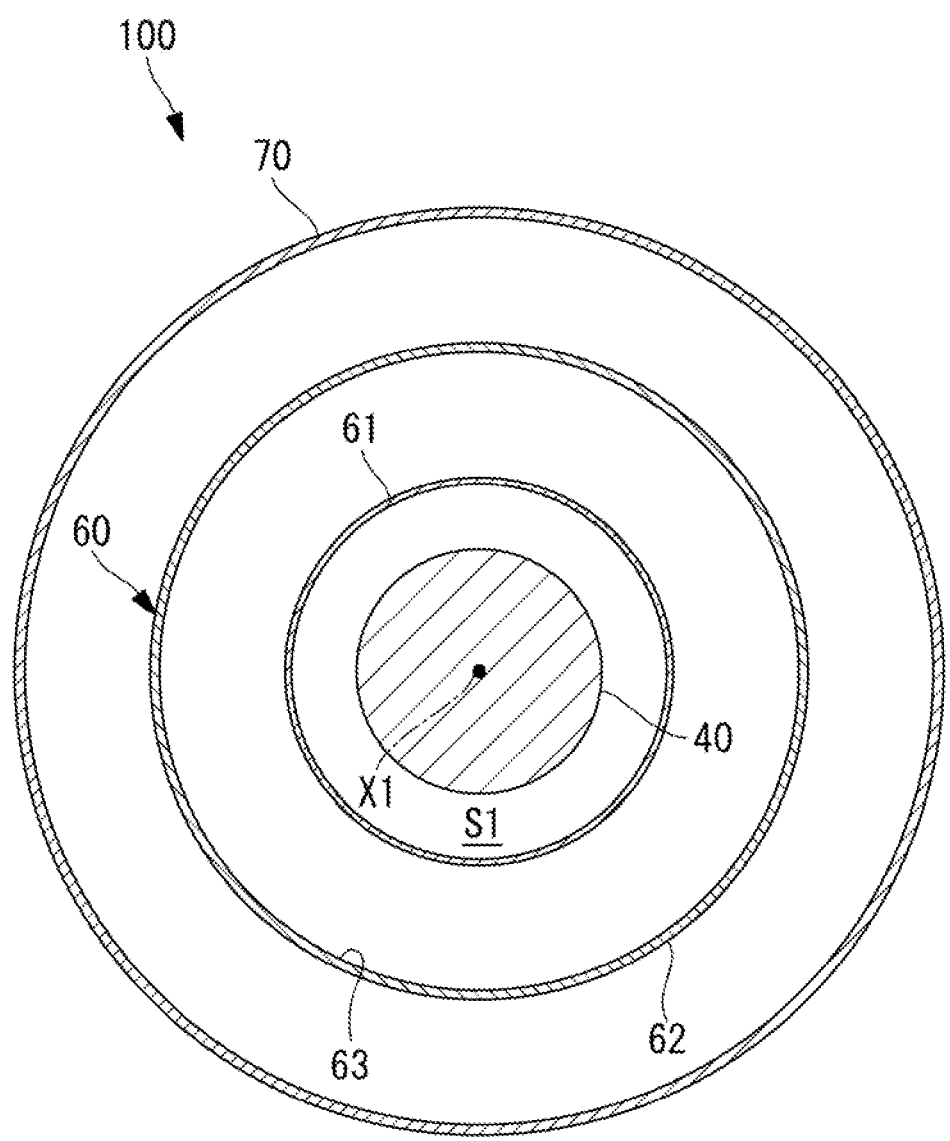
FIG. 3 is a sectional view taken along a line A-A of the gas turbine system illustrated in FIG. 2.
Figure 4:
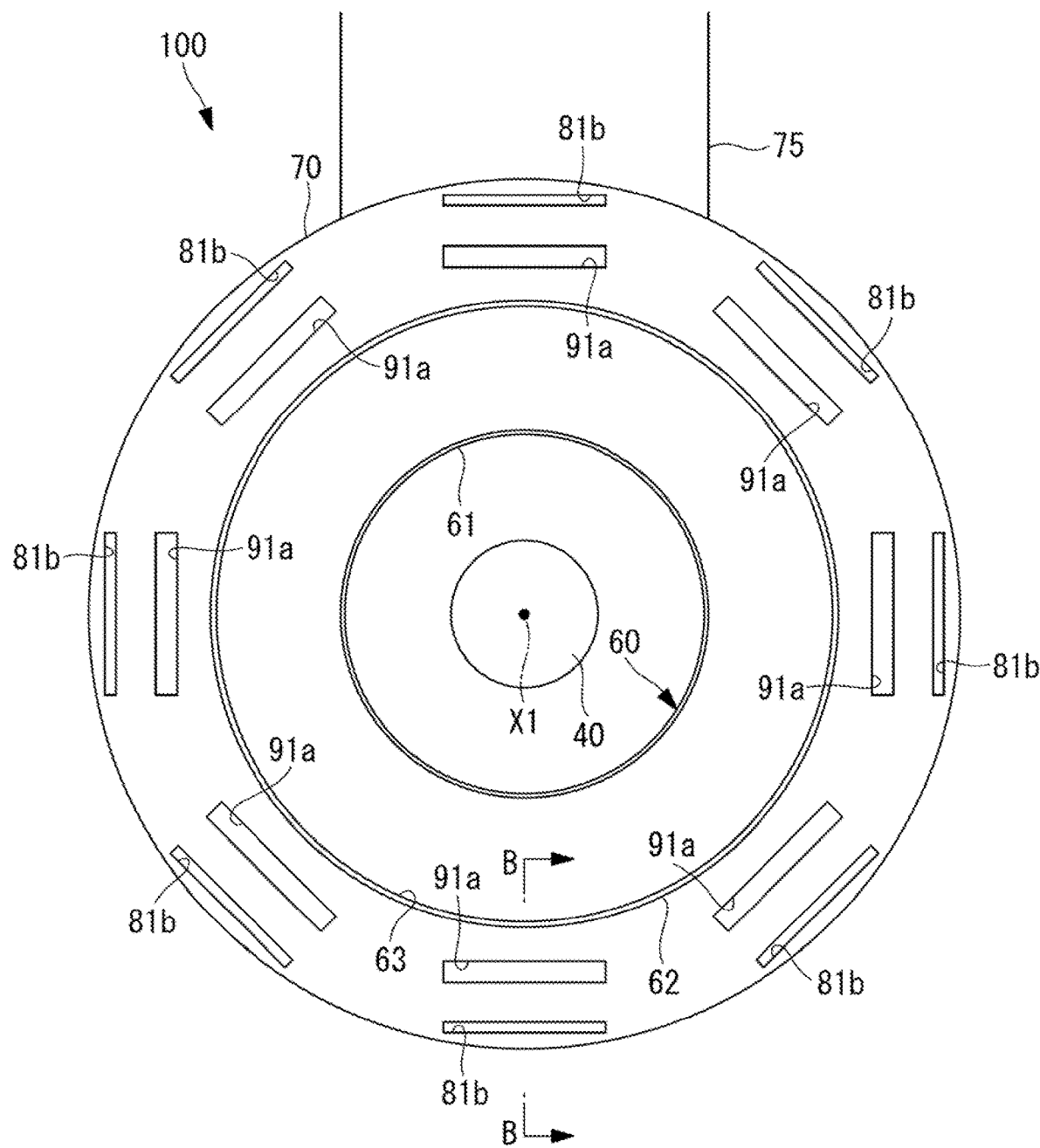
FIG. 4 is a view of the gas turbine system illustrated in FIG. 2 when viewed from downstream in a flow direction of a combustion gas along an axis line of a turbine.

An aircraft (moving body) 1 according to a first embodiment of the present disclosure will be described below with reference to the drawings. FIG. 1 is a schematic configuration diagram illustrating the aircraft 1 according to the first embodiment of the present disclosure. FIG. 2 is a longitudinal sectional view of a gas turbine system 100 illustrated in FIG. 1. FIG. 3 is a sectional view taken along a line A-A of the gas turbine system 100 illustrated in FIG. 2. FIG. 4 is a view of the gas turbine system illustrated in FIG. 2 when viewed from downstream in a flow direction of a combustion gas Gc along an axis line X1 of a turbine.

As illustrated in FIG. 1, the aircraft 1 includes a gas turbine system 100 that generates electric power and an electric fan (thrust generator) 200 that generates thrust from electric power generated by the gas turbine system 100. The aircraft 1 of the present embodiment is an apparatus that drives the electric fan 200 to obtain thrust by using electric power generated by the gas turbine system 100.

As illustrated in FIG. 1 and FIG. 2, the gas turbine system 100 includes a compressor 10, combustors 20, a turbine 30, a generator 40, turbofans 50, an exhaust unit 60, a nacelle (shell) 70, exit units (heat exchange units) 80, and introduction units 90. As illustrated in FIG. 1, electric power generated by the generator 40 is supplied to the electric fan 200.

The compressor 10 is a device that compresses external air Ex1 flowing therein from the front in the traveling direction of the aircraft 1 to generate compressed air. The compressor 10 has a plurality of rotor blades 11 that rotate about an axis line X1 and a plurality of fixed stator blades 12 and generates compressed air by passing inflow air through the plurality of rotor blades 11 and the plurality of stator blades 12.

Each combustor 20 is a device that burns compressed air generated by the compressor 10 together with fuel to generate a high-temperature and high-pressure combustion gas. The combustor 20 rotates the turbine 30 about the axis line X1 by supplying a high-temperature and high-pressure combustion gas to the turbine 30. The combustors 20 are provided at a plurality of portions about the axis line X1.

The turbine 30 is a device driven by a combustion gas generated by the combustor 20. The turbine 30 has a plurality of rotor blades 31 that rotate about the axis line X, a plurality of fixed stator blades 32, and a drive shaft 33 coupled to the rotor blades. A combustion gas is passed through the plurality of rotor blades 31 and the plurality of stator blades 32, and thereby the rotor blades 31 rotate about the axis line X1. The driving force obtained by rotation of the rotor blades 31 is transmitted to the generator 40 via the drive shaft 33.

The generator 40 is a device that is coupled to the drive shaft 33 of the turbine 30 and generates electric power by driving force of the turbine 30. The generator 40 has a rotor (not illustrated) that is coupled to the drive shaft 33 and rotates about the axis line X1 and a stator fixed and arranged around the rotor. As illustrated in FIG. 1, electric power generated by the generator 40 is supplied to the electric fan 200.

The electric fan 200 is a device that generates thrust from electric power generated by the generator 40. The electric fan 200 can be installed at any position away from the gas turbine system 100 in the aircraft 1. The electric fan 200 rotates a fan (not illustrated) to obtain thrust.

As illustrated in FIG. 2, the exhaust unit 60 guides a combustion gas Gc that has passed through the turbine 30 to outside. The exhaust unit 60 has an inner wall member 61 and an outer wall member 62. The inner wall member 61 extends along the axis line X1, about which the turbine 30 rotates, and is formed in a cylindrical shape about the axis line X1. The outer wall member 62 is formed in a cylindrical shape and extends along the axis line X1 and arranged so as to surround the outer circumference side of the inner wall member 61.

As illustrated in FIG. 3, the inner wall member 61 and the outer wall member 62 form an annular channel 63 through which a combustion gas discharged from the turbine 30 flows and which extends along the axis line X1. The annular channel 63 is a channel formed annularly about the axis line X1 and guides a combustion gas discharged from the turbine 30 to the outside.

As illustrated in FIG. 2 and FIG. 3, an accommodation space S1 surrounded by the inner wall member 61 is formed on the inner circumference side of the inner wall member 61 with respect to the axis line X1. The generator 40 is arranged in the accommodation space S1. The generator 40 is fixed to the inner wall member 61 via a fastener (not illustrated).

The nacelle 70 is a shell arranged so as to cover respective components of the gas turbine system 100 including the compressor 10, the combustors 20, the turbine 30, and the exhaust unit 60. The nacelle 70 is formed in a cylindrical shape extending along the axis line X1. The nacelle 70 is coupled to a fuselage (not illustrated) via a pylon 75.

Each exit unit 80 is a device that causes the combustion gas Gc that has passed through the turbine 30 to be guided to the discharge port 81b provided in the surface of the nacelle 70 and exchanges heat between the combustion gas Gc and external air Ex2. The exit unit 80 has an exit channel 81 and an exit fan 82 arranged to the exit channel 81. Through the exit channel 81, the combustion gas Gc that has passed through the turbine 30 is guided to the discharge port 81b provided in the surface of the nacelle 70 from the intake port 81a provided in the outer wall member 62. The combustion gas Gc discharged from the discharge port 81b is mixed with the external air Ex2 flowing on the surface of the nacelle 70 to form a mixed gas Mx, and the mixed gas Mx flows toward the end of the nacelle 70.

Figure 5:
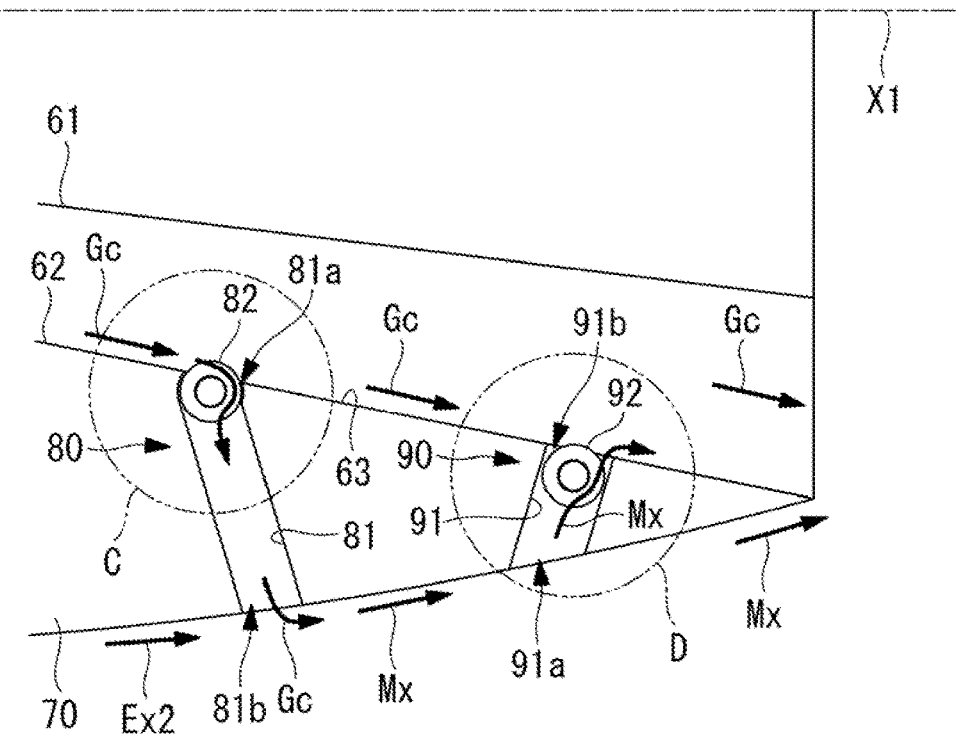
FIG. 5 is a sectional view taken along a line B-B of the gas turbine system illustrated in FIG. 4.

As illustrated in FIG. 4, the surface of the nacelle 70 is provided with the discharge ports 81b in a plurality of portions (8 portions at 45-degree intervals in the example illustrated in FIG. 4) circumferentially about the axis line X1. The plurality of exit units 80 are provided so as to correspond to the plurality of discharge ports 81b. As illustrated in FIG. 5, the combustion gases Gc flowing out to the surface of the nacelle 70 from the plurality of discharge ports 81b are mixed with the external air Ex2 to form the mixed gas Mx, respectively, and the mixed gas Mx is guided to the end of the nacelle 70.

Each temperature of the combustion gases Gc flowing out of the plurality of discharge ports 81b is sufficiently higher than the temperature of the external air Ex2 (for example, the temperature difference is 300 degrees Celsius or greater). Thus, the flow velocity of the mixed gas Mx is higher than that of the external air Ex2. Further, since the pressure and the velocity of the combustion gas Gc are also higher than those of the external air Ex2, the flow velocity of the mixed gas Mx is higher than that of the external air Ex2.

If the exit unit 80 is not provided, the temperature difference between the combustion gas Gc and the external air Ex2 is large and the flow velocity difference therebetween is also large when the combustion gas Gc and the external air Ex2 are mixed at the end of the nacelle 70, and this will cause large mixing noise.

In contrast, if the exit unit 80 is provided as with the present embodiment, the temperature difference between the combustion gas Gc and the mixed gas Mx is smaller than the temperature difference between the combustion gas Gc and the external air Ex2 and the flow velocity difference between the combustion gas Gc and the mixed gas Mx is also small when the combustion gas Gc and the mixed gas Mx are mixed at the end of the nacelle 70, and therefore the mixing noise is reduced.

Figure 6:
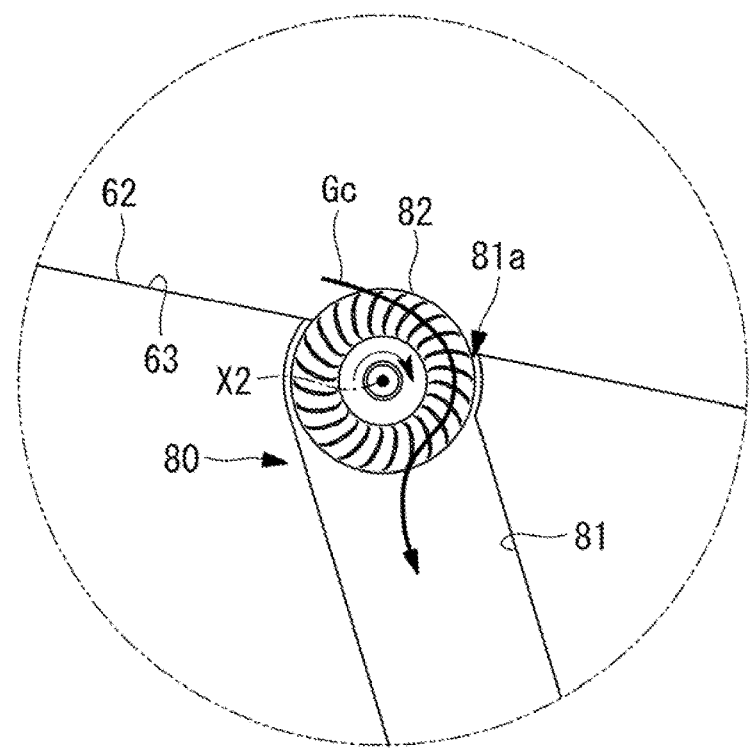
FIG. 6 is partial enlarged view of a part C illustrated in FIG. 5.

Each the exit fan 82 is a device that forcibly guides, to the exit channel 81, the combustion gas Gc flowing in the annular channel 63. The exit fan 82 is driven by electric power generated by the generator 40 or electric power supplied from another power supply device (not illustrated). As illustrated in FIG. 6, the exit fan 82 of the present embodiment is a crossflow fan that rotates about an axis line X2. The exit fan 82 rotates an impeller having blades shaped uniformly along the axis line X2 about the axis line X2 to draw the combustion gas Gc into the impeller and then discharge the drawn combustion gas Gc to the exit channel 81.

Each introduction unit 90 is a device that guides the mixed gas Mx, in which the combustion gas Gc discharged from the discharge port 81b and the external air Ex2 are mixed, to the exhaust unit 60 from the introduction port 91a provided in the surface of the nacelle 70. The introduction unit 90 has an introduction channel 91 and an introduction fan 92 arranged to the introduction channel 91.

Through the introduction channel 91, the mixed gas Mx flowing on the surface of the nacelle 70 is guided to the discharge port 91b provided in the outer wall member 62 from the introduction port 91a provided in the surface of the nacelle 70. The mixed gas Mx discharged from the discharge port 91b is mixed with the combustion gas Gc and flows toward the end of the nacelle 70. As illustrated in FIG. 2, the introduction port 91a is provided downstream of the discharge port 81b in the flow direction of the combustion gas Gc and the external air Ex2.

As illustrated in FIG. 4, the surface of the nacelle 70 is provided with the introduction ports 91a in a plurality of portions (8 portions at 45-degree intervals in the example illustrated in FIG. 4) circumferentially about the axis line X1. The plurality of introduction units 90 are provided so as to correspond to the plurality of introduction ports 91a. Each discharge port 81b and the corresponding introduction port 91a are arranged at the same position in the circumferential direction. Note that each discharge port 81b and the corresponding introduction port 91a may be arranged so as to partially overlap each other in the circumferential direction without being arranged at exactly the same position in the circumferential direction.

Since the discharge port 81b and the introduction port 91a are arranged at circumferentially overlapping positions, a part of the mixed gas Mx, in which the combustion gas Gc flowing out of the discharge port 81b and the external air Ex2 are mixed, is guided from the introduction port 91a to the introduction channel 91. The mixed gases Mx discharged from the plurality of discharge ports 91b to the exhaust unit 60 have a sufficiently lower temperature than the combustion gas Gc and have a sufficiently lower pressure than the combustion gas Gc. Thus, the flow velocity of the combustion gas Gc is lower when the mixed gas Mx is discharged to the exhaust unit 60 than when the mixed gas Mx is not discharged to the exhaust unit 60.

If the introduction unit 90 is not provided, the temperature difference and the pressure difference between the combustion gas Gc and the mixed gas Mx are large and the flow velocity difference therebetween is also large when the combustion gas Gc and the mixed gas Mx are mixed at the end of the nacelle 70, and this will cause large mixing noise. In contrast, if the introduction unit 90 is provided as with the present embodiment, the temperature difference and the pressure difference between the combustion gas Gc and the mixed gas Mx are small and the flow velocity difference therebetween is also small when the combustion gas Gc and the mixed gas Mx are mixed at the end of the nacelle 70, and therefore the mixing noise is reduced.

Figure 7:
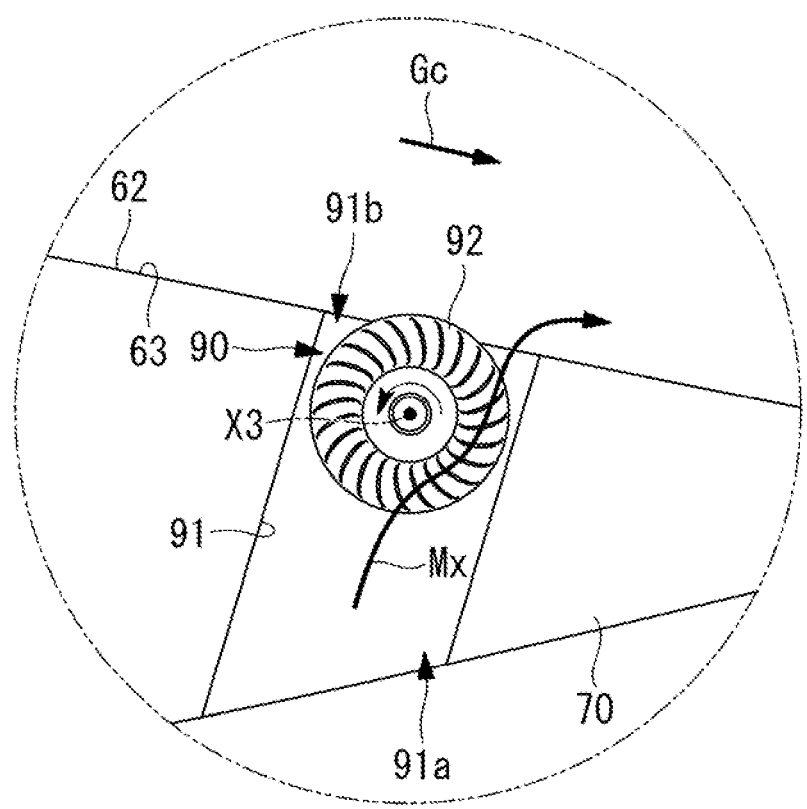
FIG. 7 is partial enlarged view of a part D illustrated in FIG. 5.

The introduction fan 92 is a device that forcibly guides, to the introduction channel 91, the mixed gas Mx flowing on the surface of the nacelle 70. The introduction fan 92 is driven by electric power generated by the generator 40 or electric power supplied from another power supply device (not illustrated). As illustrated in FIG. 7, the introduction fan 92 of the present embodiment is a crossflow fan that rotates about an axis line X3. The introduction fan 92 rotates an impeller having blades shaped uniformly along the axis line X3 about the axis line X3 to draw the mixed gas Mx into the impeller and then discharge the drawn mixed gas Mx to the annular channel 63.

The effects and advantages achieved by the aircraft 1 of the present embodiment described above will be described.

The aircraft 1 according to the present disclosure includes the compressor 10 that compresses external air Ex2 to generate compressed air, the combustor 20 that burns the compressed air generated by the compressor 10 together with fuel to generate a combustion gas Gc, the turbine 30 driven by the combustion gas Gc generated by the combustor 20, the exhaust unit 60 that guides the combustion gas Gc that has passed through the turbine 30 to the outside, the nacelle 70 formed in a cylindrical shape and extending along the axis line X1 about which the turbine 30 rotates and arranged so as to cover the compressor 10, the combustor 20, the turbine 30, and the exhaust unit 60, and the exit unit 80 that exchanges heat between the combustion gas Gc that has passed through the turbine 30 and the external air Ex2 flowing on the surface of the nacelle 70.

According to the aircraft 1 of the present disclosure, a part of the combustion gas Gc whose temperature is higher than the external air Ex2 guided to the exhaust unit 60 after passing through the turbine 30 is heat-exchanged with the external air Ex2 by the exit unit 80, and the temperature of the mixed gas Mx, in which the combustion gas Gc and the external air Ex2 are mixed, increases above the temperature of the external air Ex2. If the exit unit 80 is not provided, the temperature difference between the combustion gas Gc and the external air Ex2 is large and the flow velocity difference therebetween is also large when the combustion gas Gc and the external air Ex2 are mixed at the end of the nacelle 70, and this will cause large mixing noise.

In contrast, in the aircraft 1 according to the present disclosure, since the exit unit 80 is provided, the temperature difference between the combustion gas Gc and the mixed gas Mx is smaller than the temperature difference between the combustion gas Gc and the external air Ex2 and the flow velocity difference the combustion gas Gc and the mixed gas Mx is also small when the combustion gas Gc and the mixed gas Mx are mixed at the end of the nacelle 70, and therefore the mixing noise can be reduced.

According to the aircraft 1 according to the present disclosure, the exit unit 80 causes the combustion gas Gc that has passed through the turbine 30 to be guided to the discharge port 81b provided in the surface of the nacelle 70 and to be mixed with the external air Ex2 and thereby exchanges heat between the combustion gas Gc and the external air Ex2. According to the aircraft 1 of the present disclosure, a part of the combustion gas Gc whose temperature is higher than the external air Ex2 guided to the exhaust unit 60 after passing through the turbine 30 is guided by the exit unit 80 to the discharge port 81b provided in the surface of the nacelle 70, then mixed with the external air Ex2, and thereby heat-exchanged with the external air Ex2.

The aircraft 1 according to the present disclosure includes the introduction unit 90 that guides the mixed gas Mx, in which the combustion gas Gc discharged from the discharge port 81b and the external air Ex2 are mixed, to the exhaust unit 60 from the introduction port 91a provided in the surface of the nacelle 70. According to the aircraft 1 of the present disclosure, a part of the mixed gas Mx, in which the combustion gas Gc discharged to the surface of the nacelle 70 by the exit unit 80 and the external air Ex2 are mixed, is guided by the introduction unit 90 to the discharge port 91b provided in the exhaust unit 60 and is mixed with the combustion gas Gc.

If the introduction unit 90 is not provided, the temperature difference between the combustion gas Gc and the mixed gas Mx is large and the flow velocity difference therebetween is also large when the combustion gas Gc and the mixed gas Mx are mixed at the end of the nacelle 70, and this will cause large mixing noise. In contrast, in the aircraft 1 according to the present disclosure, since the introduction unit 90 is provided, the temperature difference between the combustion gas Gc and the mixed gas Mx is small and the flow velocity difference therebetween is also small when the combustion gas Gc and the mixed gas Mx are mixed at the end of the nacelle 70, and therefore the mixing noise can be reduced.

In the aircraft 1 according to the present disclosure, the discharge ports 81b are provided in a plurality of portions in the circumferential direction about the axis line X1, the introduction ports 91a are provided in a plurality of portions in the circumferential direction, and each of the discharge ports 81b and the corresponding introduction port 91a are arranged at a circumferentially overlapping position. Thus, a part of the mixed gas Mx, in which the combustion gas Gc discharged from the discharge port 81b and the external air Ex2 are mixed, is guided to the introduction unit 90 from the introduction port 91a arranged at a position overlapping the discharge port 81b in the circumferential direction.

Second Embodiment

An aircraft (moving body) according to a second embodiment of the present disclosure will be described below with reference to the drawings. The present embodiment is a modified example of the first embodiment and is assumed to be the same as the first embodiment unless particularly described below, and the description thereof will be omitted below. A gas turbine system 100A according to the present embodiment differs from the gas turbine system 100 according to the first embodiment in that a channel forming portion 76 is provided.

Figure 8:
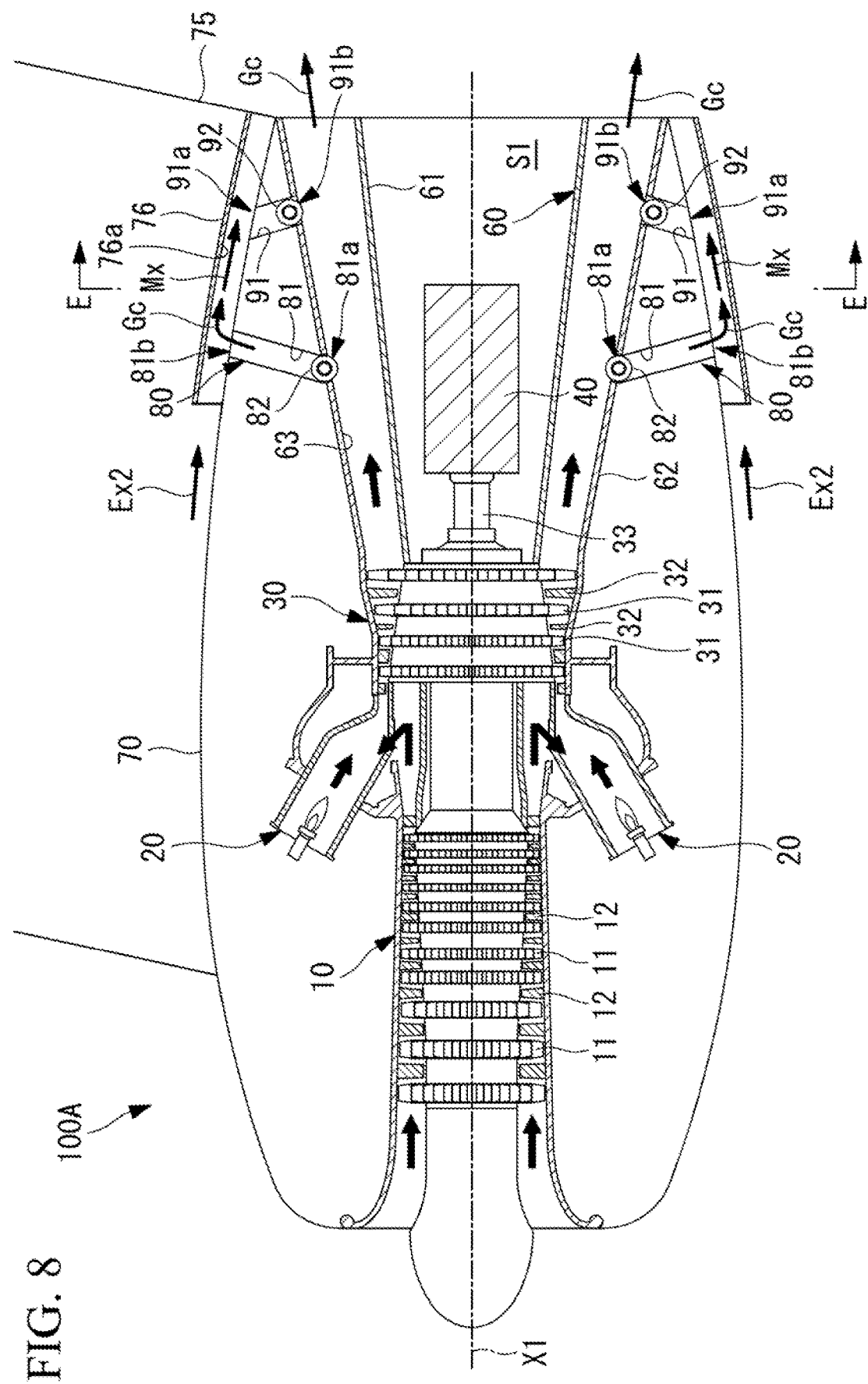
FIG. 8 is a longitudinal sectional view illustrating a gas turbine system according to a second embodiment of the present disclosure.
Figure 9:
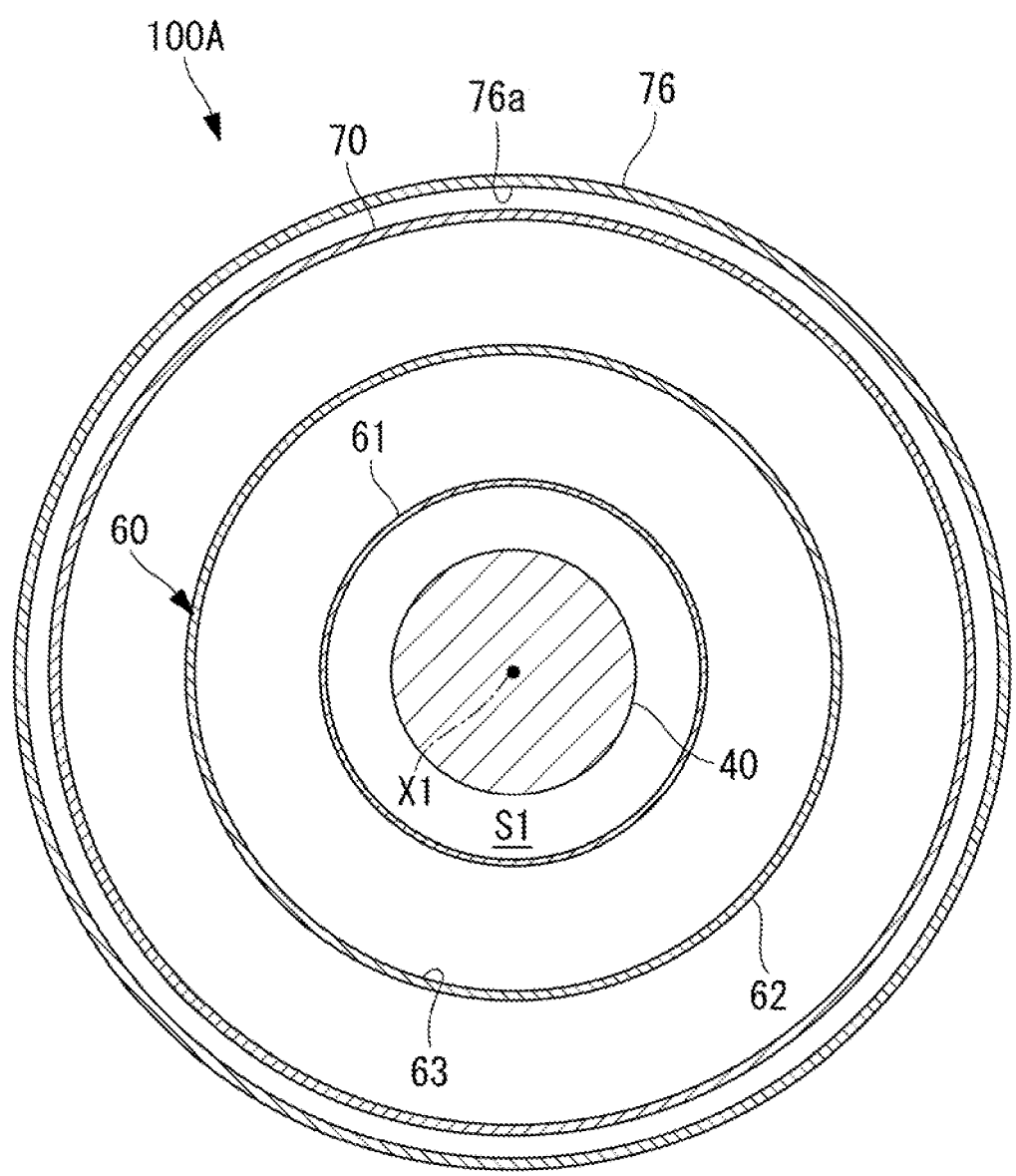
FIG. 9 is a sectional view taken along a line E-E of the gas turbine system illustrated in FIG. 8.
Figure 10:
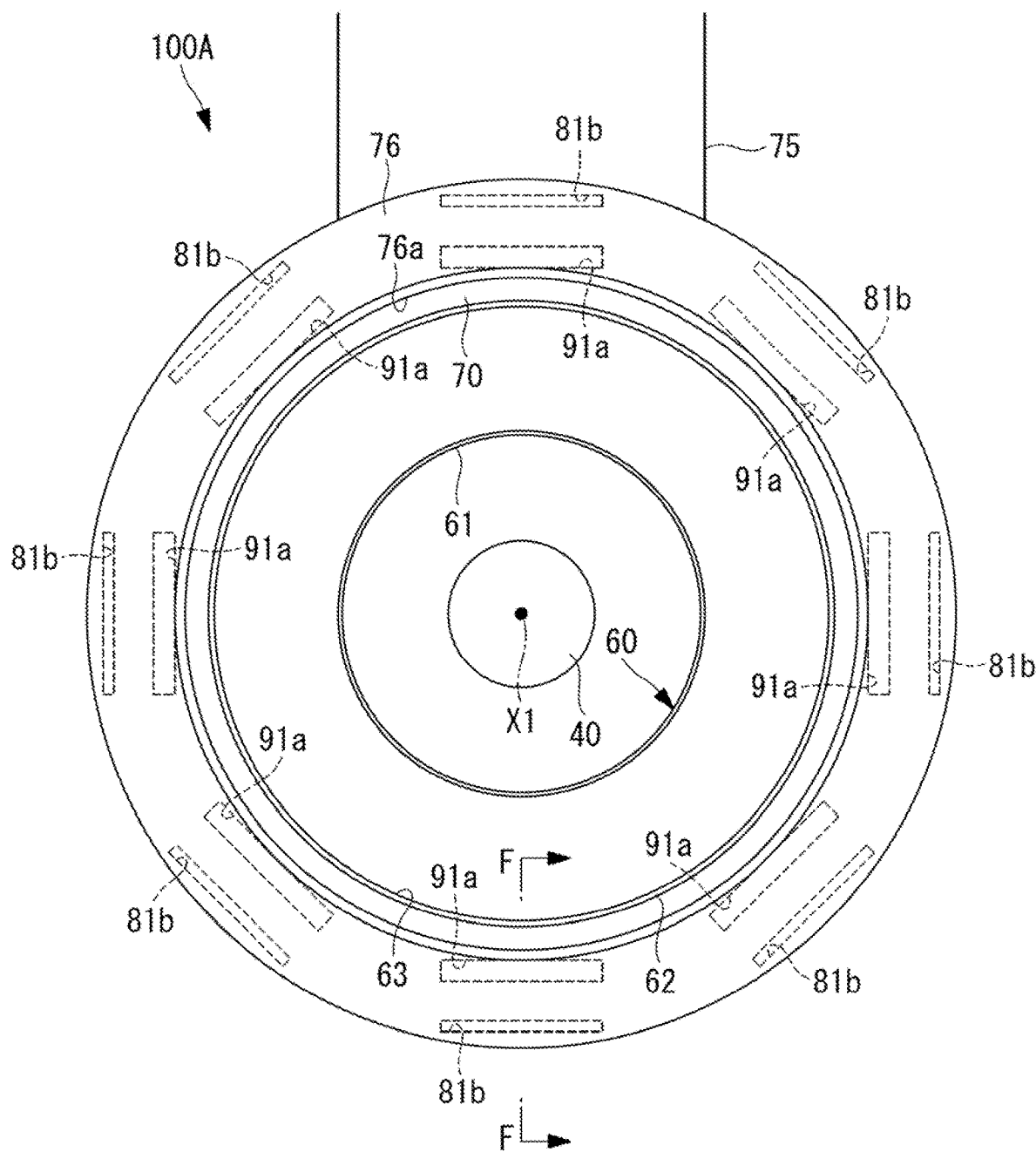
FIG. 10 is a view of the gas turbine system illustrated in FIG. 8 when viewed from downstream in a flow direction of a combustion gas along an axis line of a turbine.

FIG. 8 is a longitudinal sectional view illustrating the gas turbine system 100A according to the present embodiment. FIG. 9 is a sectional view taken along a line E-E of the gas turbine system 100A illustrated in FIG. 8. FIG. 10 is a view of the gas turbine system 100A illustrated in FIG. 8 when viewed from downstream in the flow direction of the combustion gas Gc along an axis line X1 of the turbine 30.

As illustrated in FIG. 8 and FIG. 9, the channel forming portion 76 is a member extending along the axis line X1 and formed cylindrically about the axis line X1. As illustrated in FIG. 9, the channel forming portion 76 forms a mixed gas channel 76a formed annularly about the axis line X1. As illustrated in FIG. 10, the channel forming portion 76 is arranged coaxially with the nacelle 70 so as to cover the discharge ports 81b and the introduction ports 91a. The mixed gas channel 76a is a channel which is formed between the channel forming portion 76 and the surface of the nacelle 70 and through which the mixed gas Mx, in which the combustion gases Gc discharged from the discharge ports 81b and the external air Ex2 are mixed, flows.

Figure 11:
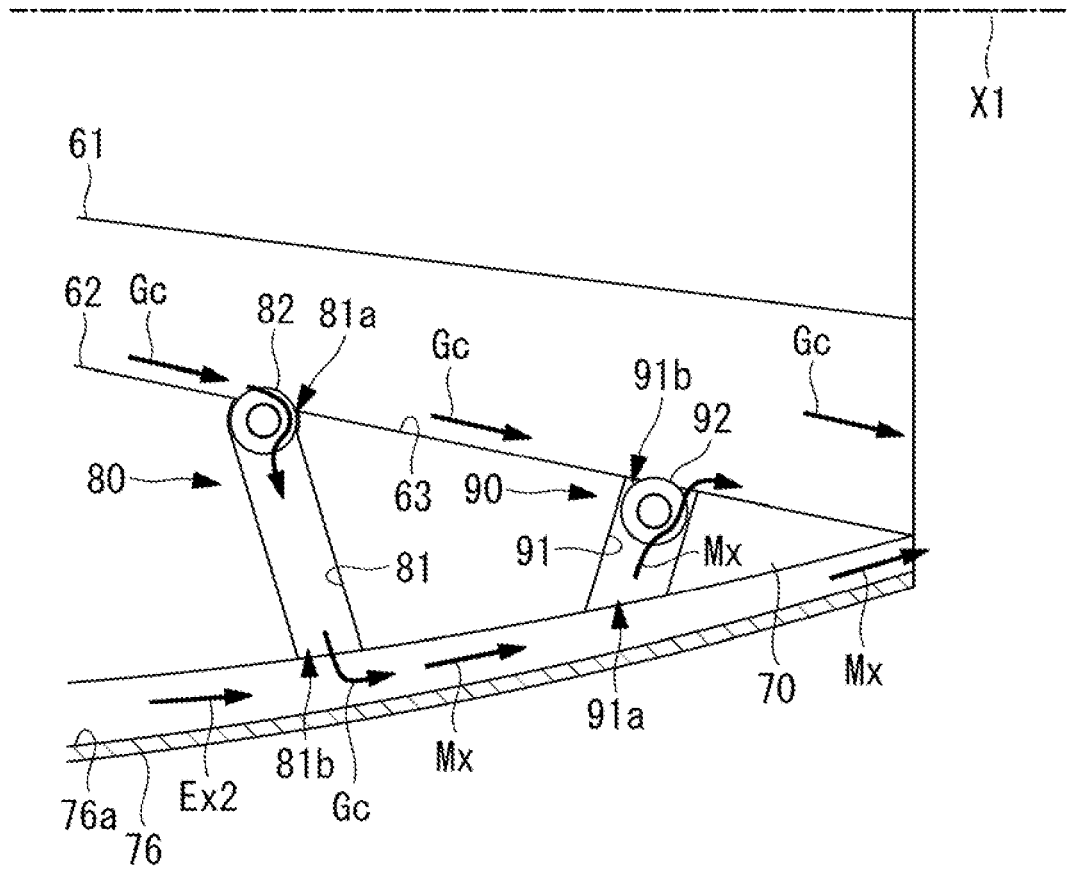
FIG. 11 is a sectional view taken along a line F-F of the gas turbine system illustrated in FIG. 10.

As illustrated in FIG. 11, the combustion gas Gc that flowing out of the plurality of discharge ports 81b to the surface of the nacelle 70 is mixed with the external air Ex2 to form the mixed gas Mx, respectively, and guided to the end of the nacelle 70. The temperature of the combustion gas Gc flowing out of the plurality of discharge ports 81b is sufficiently higher than the temperature of the external air Ex2 (for example, the temperature difference is 300 degrees Celsius or greater). Thus, the flow velocity of the mixed gas Mx is higher than the external air Ex2. Further, since the pressure and the velocity of the combustion gas Gc are also higher than those of the external air Ex2, the flow velocity of the mixed gas Mx is higher than that of the external air Ex2.

The combustion gas Gc flowing out of the plurality of the discharge ports 81b to the surface of the nacelle 70 flows through the mixed gas channel 76a formed between the channel forming portion 76 and the surface of the nacelle 70. Since the mixed gas channel 76a is a channel covered with the channel forming portion 76, external air flowing on the outer circumference side of the channel forming portion 76 with respect to the axis line X1 does not flows into the channel.

Thus, the flow amount of the external air Ex2 to be mixed with the combustion gas Gc is restricted, and the temperature of the mixed gas Mx can be increased compared to a case where the channel forming portion 76 is not provided. Accordingly, the flow velocity difference between the mixed gas Mx and the combustion gas Gc mixed at the end of the nacelle 70 is smaller than in the case where the channel forming portion 76 is not provided, and the mixing noise is further reduced.

Third Embodiment

An aircraft (moving body) according to a third embodiment of the present disclosure will be described below with reference to the drawings. The present embodiment is a modified example of the first embodiment and is assumed to be the same as the first embodiment unless particularly described below, and the description thereof will be omitted below. A gas turbine system 100B according to the present embodiment differs from the gas turbine system 100 according to the first embodiment in that channel forming portions 77 are provided.

Figure 12:
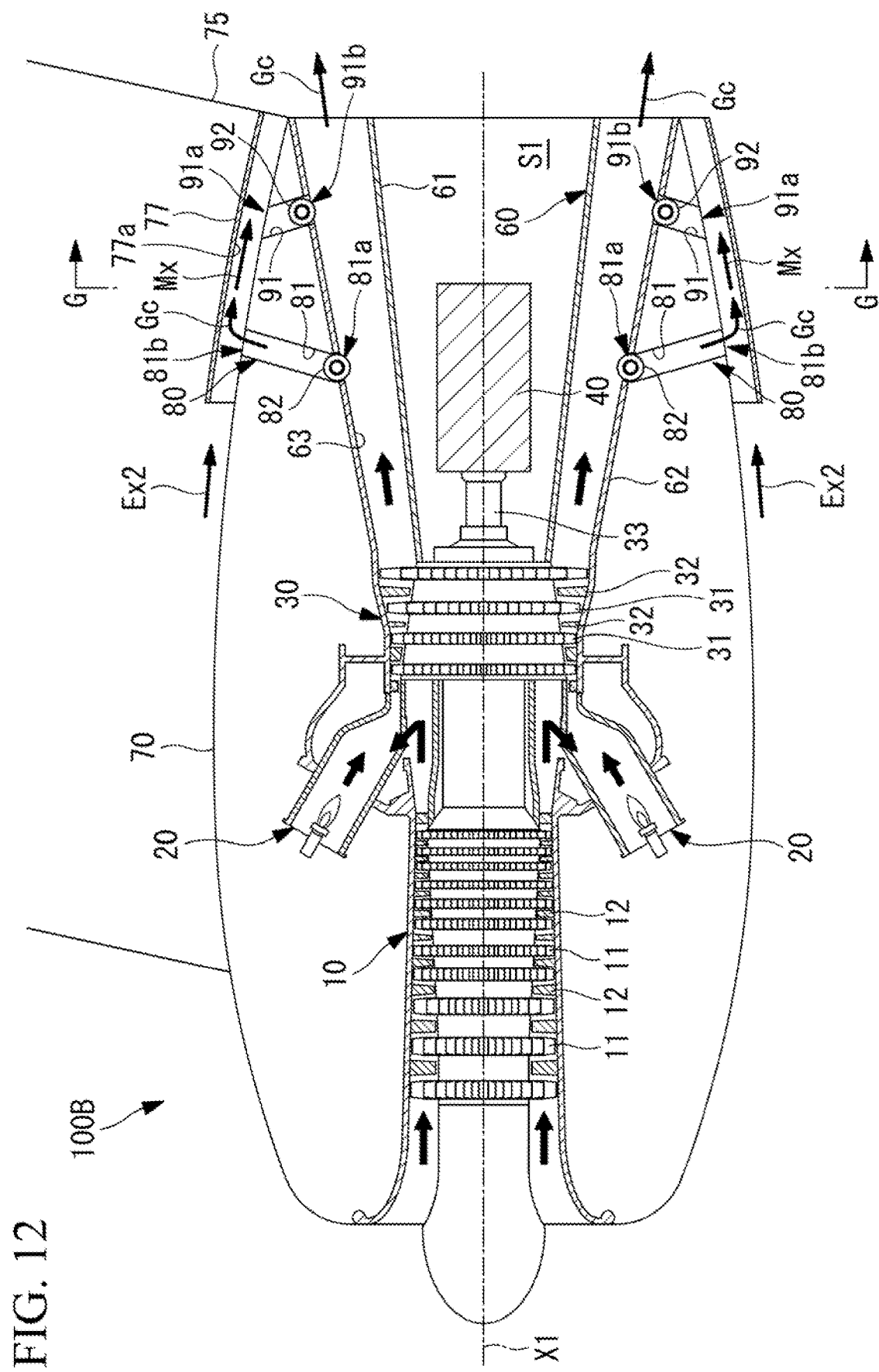
FIG. 12 is a longitudinal sectional view illustrating a gas turbine system according to a third embodiment of the present disclosure.
Figure 13:
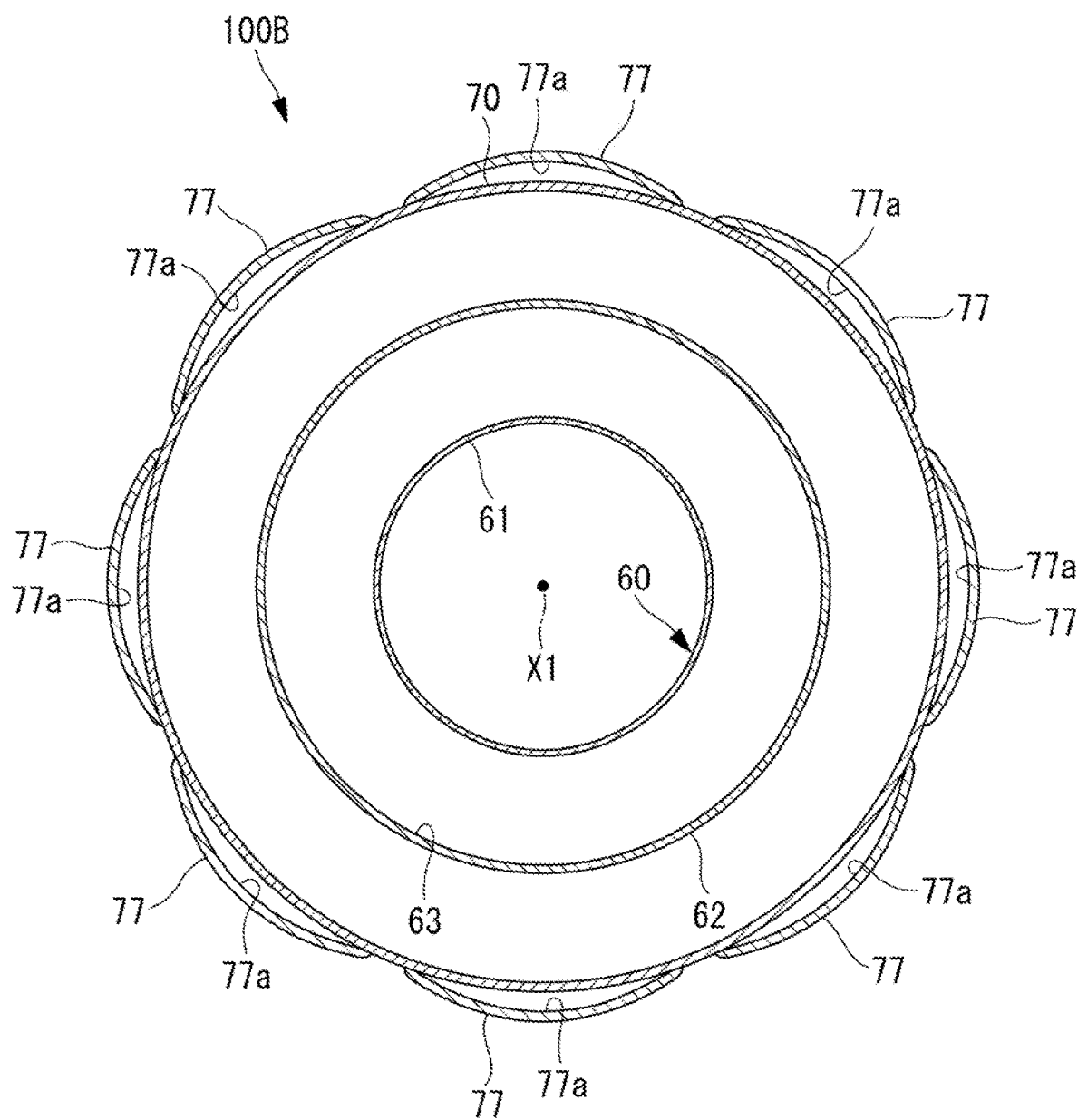
FIG. 13 is a sectional view taken along a line G-G of the gas turbine system illustrated in FIG. 12.
Figure 14:
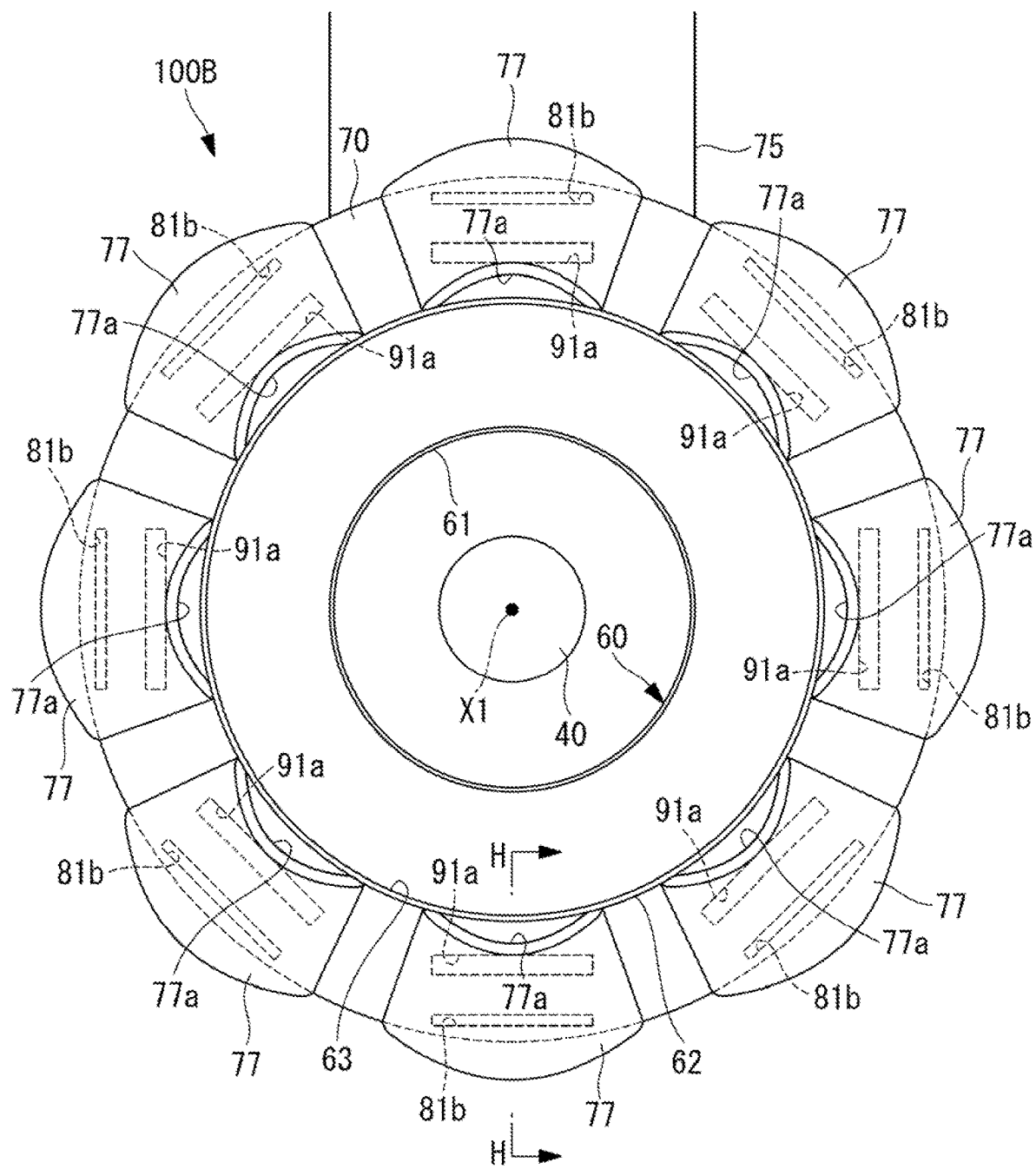
FIG. 14 is a view of the gas turbine system illustrated in FIG. 12 when viewed from downstream in a flow direction of a combustion gas along an axis line of a turbine.

FIG. 12 is a longitudinal sectional view illustrating the gas turbine system 100B according to the present embodiment. FIG. 13 is a sectional view taken along a line G-G of the gas turbine system 100B illustrated in FIG. 12. FIG. 14 is a view of the gas turbine system 100B illustrated in FIG. 12 when viewed from downstream in the flow direction of the combustion gas Gc along an axis line X1 of the turbine 30.

As illustrated in FIG. 12 and FIG. 14, the channel forming portions 77 are members each extending along the axis line X1 and spaced apart in a plurality of portions in the circumferential direction so as to cover both the discharge ports 81b and the introduction ports 91a. As illustrated in FIG. 13 and FIG. 14, the channel forming portions 77 are spaced apart in a discrete manner circumferentially about the axis line X1 (8 portions at 45-degree intervals in the example illustrated in FIG. 13 and FIG. 14). A mixed gas channel 77a is a channel which is formed between the channel forming portion 77 and the surface of the nacelle 70 and through which the mixed gas Mx, in which the combustion gases Gc discharged from the discharge ports 81b and the external air Ex2 are mixed, flows.

Figure 15:
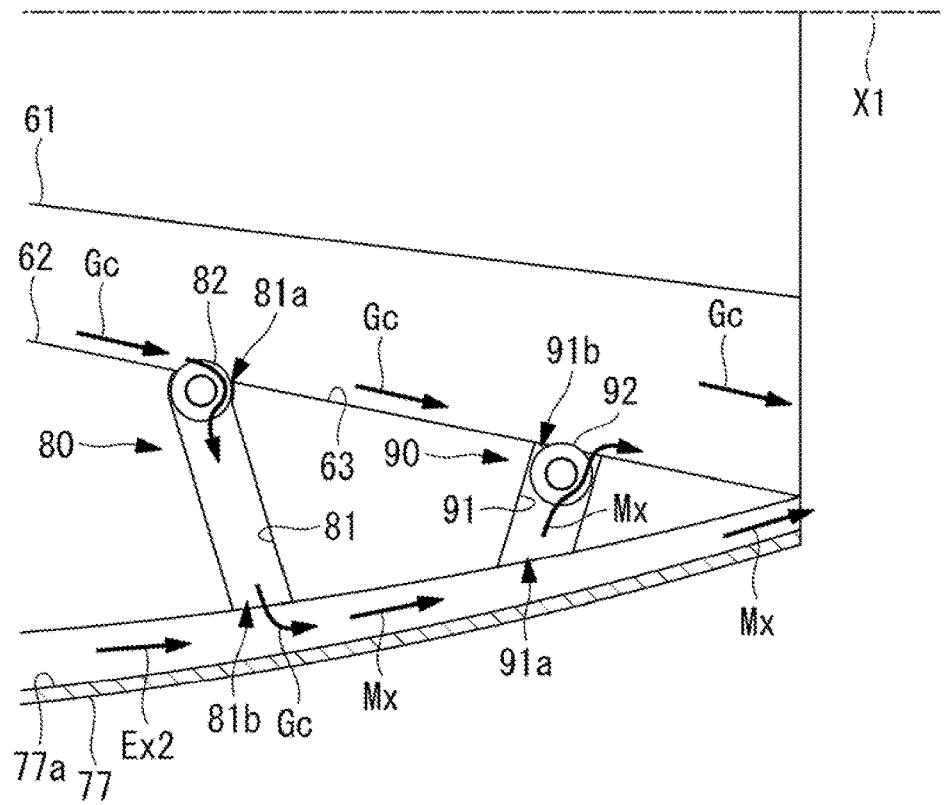
FIG. 15 is a sectional view taken along a line H-H of the gas turbine system illustrated in FIG. 14.

As illustrated in FIG. 15, the combustion gas Gc flowing out of the plurality of discharge ports 81b to the surface of the nacelle 70 is mixed with the external air Ex2 to form the mixed gas Mx, respectively, and guided to the end of the nacelle 70. The temperature of the combustion gas Gc flowing out of the plurality of discharge ports 81b is sufficiently higher than the temperature of the external air Ex2 (for example, the temperature difference is 300 degrees Celsius or greater). Thus, the flow velocity of the mixed gas Mx is higher than the external air Ex2. Further, since the pressure and the velocity of the combustion gas Gc are also higher than those of the external air Ex2, the flow velocity of the mixed gas Mx is higher than that of the external air Ex2.

The combustion gas Gc flowing out of the plurality of the discharge ports 81b to the surface of the nacelle 70 flows through the mixed gas channel 77a formed between the channel forming portion 77 and the surface of the nacelle 70. Since the mixed gas channel 77a is a channel covered with the channel forming portion 77, external air flowing on the outer circumference side of the channel forming portion 77 with respect to the axis line X1 does not flows into the channel.

Thus, the flow amount of the external air Ex2 to be mixed with the combustion gas Gc is restricted, and the temperature of the mixed gas Mx can be increased compared to a case where the channel forming portion 77 is not provided. Accordingly, the flow velocity difference between the mixed gas Mx and the combustion gas Gc mixed at the end of the nacelle 70 is smaller than in the case where the channel forming portion 77 is not provided, and the mixing noise is further reduced.

The channel forming portions 77 are spaced apart in a discrete manner circumferentially about the axis line X1. Thus, a region where the external air Ex2 flows and a region where the mixed gas Mx flows are repeated alternately on the surface of the nacelle 70 along the circumferential direction. Since this facilitates mixing of the external air Ex2 and the mixed gas Mx at each position in the circumferential direction, the flow velocity difference between the mixed gas Mx and the combustion gas Gc mixed at the end of the nacelle 70 is smaller, the mixing noise is further reduced.

Other Embodiments

Although it has been described above that the gas turbine systems provided to an aircraft include the introduction unit 90 that guides the mixed gas Mx to the exhaust unit 60 from the introduction port 91a provided in the surface of the nacelle 70, the gas turbine system may be formed without the introduction unit 90. Even without the introduction unit 90, the combustion gas Gc guided to the surface of the nacelle 70 from the exhaust unit 60 by the exit unit 80 and the external air Ex2 are heat-exchanged, and therefore the mixing noise can be reduced.

Figure 16:
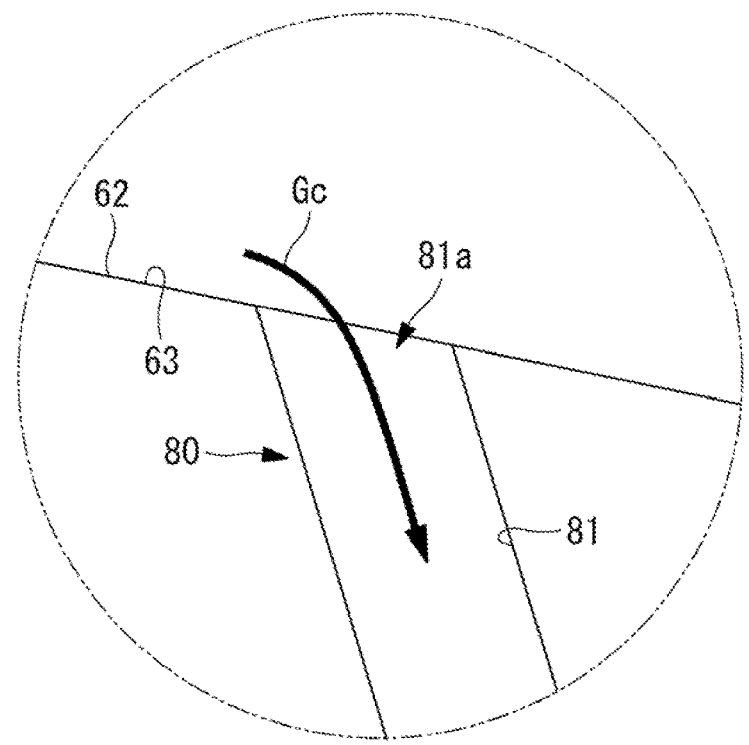
FIG. 16 is a sectional view illustrating an exit unit according to a modified example.

Although it has been described above that the exit unit 80 provided to the gas turbine system includes the exit fan 82 that forcibly guides the combustion gas Gc to the exit channel 81, another form may be employed. For example, as illustrated in FIG. 16, the exit unit 80 may be formed without the exit fan 82. Since the combustion gas Gc flowing through the annular channel 63 has a higher pressure than the external air Ex2, the combustion gas Gc can be guided to the discharge port 81b provided in the surface of the nacelle 70 from the exit channel 81 due to the pressure difference.

Although it has been described above that the introduction port 91a that guides the mixed gas Mx to the introduction unit 90 from the surface of the nacelle 70 is shaped such that an opening is provided in a plane, another form may be employed. For example, as illustrated in FIG. 17, an intake portion 78 may be provided so as to cover the introduction port 91a, and the mixed gas Mx flowing on the surface of the nacelle 70 may be forcibly guided to the introduction port 91a.

Figure 17:
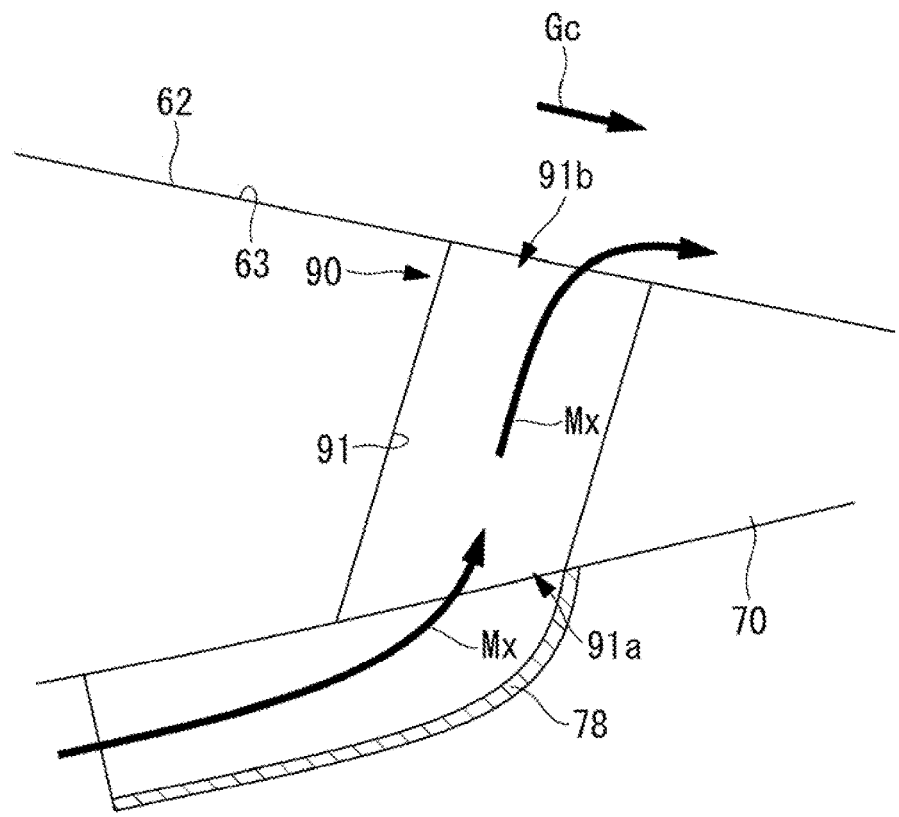
FIG. 17 is a sectional view illustrating an introduction unit according to a modified example.

The intake portion 78 illustrated in FIG. 17 is a member arranged so as to form a channel between the intake portion 78 and the surface of the nacelle 70. The intake portion 78 is opened upstream in the flow direction of the mixed gas Mx and arranged so as to close the channel at a position where the introduction port 91a is arranged. The entire amount of the mixed gas Mx flowing in the channel formed of the intake portion 78 on the upstream in the flow direction of the mixed gas Mx is forcibly guided to the introduction port 91a.

Although it has been described above that the introduction port 91a that guides the mixed gas Mx to the introduction unit 90 from the surface of the nacelle 70 is shaped such that an opening is provided in a plane, another form may be employed. For example, as illustrated in FIG. 18, a scoop portion 79 recessed toward the exhaust unit 60 side from the surface of the nacelle 70 may be provided upstream in the flow direction of the mixed gas Mx with respect to the introduction port 91a, and the mixed gas Mx flowing on the surface of the nacelle 70 may be forcibly guided to the introduction port 91a.

Figure 18:
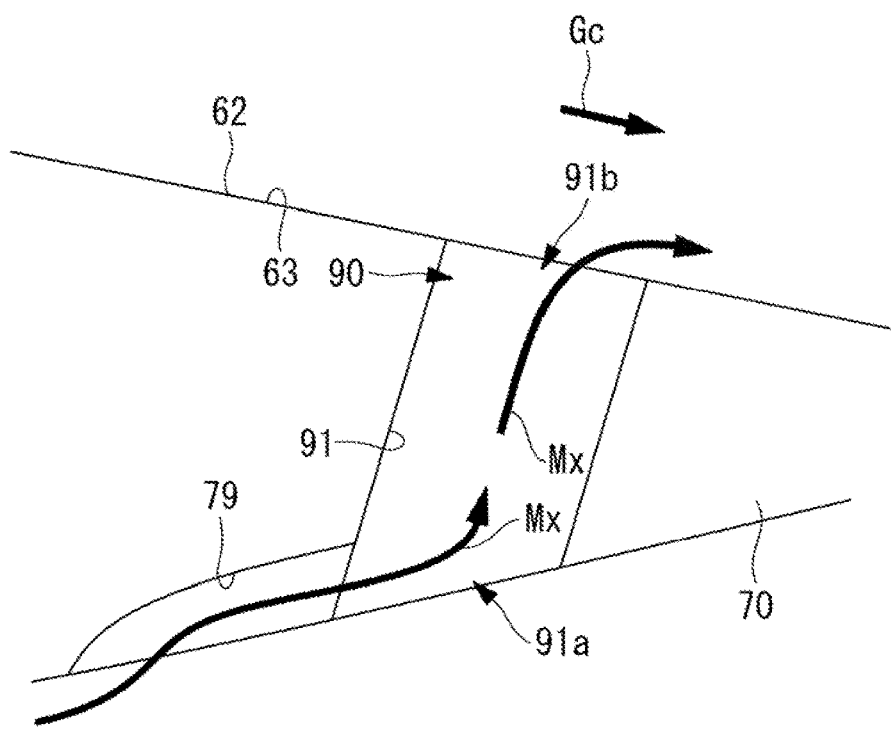
FIG. 18 is a sectional view illustrating an introduction unit according to a modified example.

The scoop portion 79 illustrated in FIG. 18 has a shape recessed toward the exhaust unit 60 side from the surface of the nacelle 70. The scoop portion 79 introduces a part of the mixed gas Mx from upstream in the flow direction of the mixed gas Mx and forcibly guides the introduced mixed gas Mx to the introduction port 91a.

Figure 19:
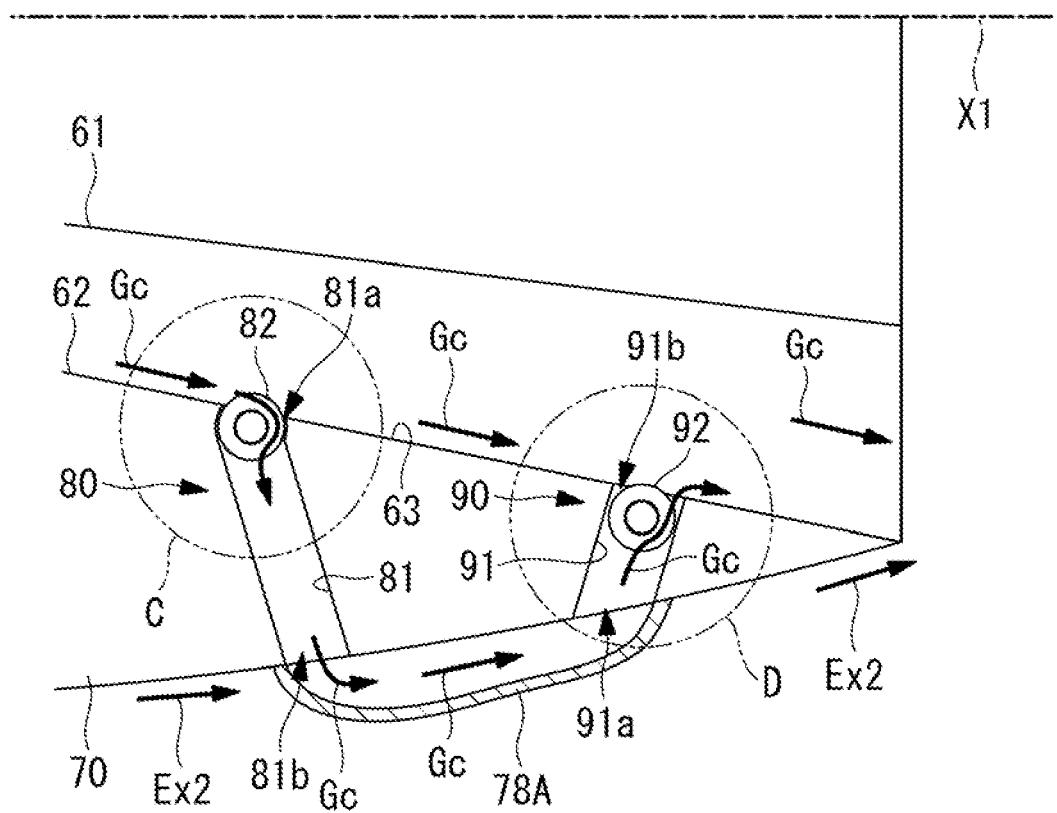
FIG. 19 is a sectional view of a gas turbine system according to a modified example.

Although it has been described above that heat exchange between the combustion gas Gc and the external air Ex2 is performed by discharging the combustion gas Gc to the surface of the nacelle 70 from the exit unit 80 to be mixed with the external air Ex2, another form may be employed. As illustrated in FIG. 19, a closed channel member 78A may be used to provide a closed channel through which the combustion gas Gc flows on the surface part of the nacelle 70, and heat may be exchanged via the closed channel member 78A without mixing the combustion gas Gc with the external air Ex2.

The closed channel member 78A illustrated in FIG. 19 is a member arranged so as to form a closed channel through which only the combustion gas Gc flows between the member and the surface of the nacelle 70. The closed channel member 78A is provided so as to form a closed channel that connects the discharge port 81b and the introduction port 91a to each other. The entire amount of the combustion gas Gc discharged from the discharge port 81b flows through the closed channel and is guided to the introduction port 91a.

The gas turbine system of each embodiment described above is understood as follows, for example.

A gas turbine system (100) according to the present disclosure includes: a compressor (10) that compresses external air to generate compressed air; a combustor (20) that burns the compressed air generated by the compressor (10) together with fuel to generate a combustion gas; a turbine (30) driven by the combustion gas generated by the combustor (20); an exhaust unit (60) that guides a combustion gas that passed through the turbine (30) to outside; a shell (70) formed in a cylindrical shape and extending along an axis line (X1) about which the turbine (30) rotates and arranged so as to cover the compressor (10), the combustor (20), the turbine (30), and the exhaust unit (60); and a heat exchange unit (80) that exchanges heat between the combustion gas that passed through the turbine (30) and external air flowing on the surface of the shell (70).

According to the gas turbine system (100) of the present disclosure, a part of the combustion gas (Gc) whose temperature is higher than the external air (Ex2) guided to the exhaust unit (60) after passing through the turbine (30) is heat-exchanged with the external air (Ex2) by the heat exchange unit (80), and the temperature of the mixed gas (Mx), in which the combustion gas (Gc) and the external air (Ex2) are mixed, increases above the temperature of the external air (Ex2). If the heat exchange unit (80) is not provided, the temperature difference and the pressure difference between the combustion gas (Gc) and the external air (Ex2) are large and the flow velocity difference therebetween is also large when the combustion gas (Gc) and the external air (Ex2) are mixed at the end of the shell (70), and this will cause large mixing noise.

In contrast, in the gas turbine system (100) according to the present disclosure, since the heat exchange unit (80) is provided, the temperature difference between the combustion gas (Gc) and the mixed gas (Mx) is smaller than the temperature difference between the combustion gas (Gc) and the external air (Ex2) and the flow velocity difference between the combustion gas (Gc) and the mixed gas (Mx) is also small when the combustion gas (Gc) and the external air (Ex2) are mixed at the end of the shell (70), and therefore the mixing noise can be reduced.

In the gas turbine system (100) according to the present disclosure, the heat exchange unit (80) exchanges heat between a combustion gas and external air by guiding, to a discharge port (81b) provided in the surface of the shell (70), a combustion gas that passed through the turbine (30) and mixing the combustion gas with external air. According to the gas turbine system (100) of the present disclosure, a part of the combustion gas (Gc) whose temperature is higher than the external air (Ex2) guided to the exhaust unit (60) after passing through the turbine (30) is guided by the heat exchange unit (80) to the discharge port (81b) provided in the surface of the shell (70), mixed with the external air (Ex2), and thereby heat-exchanged with the external air (Ex2).

The gas turbine system (100) according to the present disclosure includes an introduction unit (90) that guides the mixed gas, in which the combustion gas discharged from the discharge port (81b) and external air are mixed, to the exhaust unit (60) from an introduction port (91a) provided in the surface of the shell (70). According to the gas turbine system (100) of the present disclosure, a part of the mixed gas (Mx), in which the combustion gas (Gc) discharged to the surface of the shell (70) by the heat exchange unit (80) and the external air (Ex2) are mixed, is guided by the introduction unit (90) to the discharge port (91b) provided to the exhaust unit (60) and is mixed with the combustion gas (Gc).

If the introduction unit (90) is not provided, the temperature difference and the pressure difference between the combustion gas (Gc) and the mixed gas (Mx) are large and the flow velocity difference therebetween is also large when the combustion gas (Gc) and the mixed gas (Mx) are mixed at the end of the shell (70), and this will cause large mixing noise. In contrast, in the gas turbine system (100) according to the present disclosure, since the introduction unit (90) is provided, the temperature difference and the pressure difference between the combustion gas (Gc) and the mixed gas (Mx) are small and the flow velocity difference therebetween is also small when the combustion gas (Gc) and the mixed gas (Mx) are mixed at the end of the shell (70), and therefore the mixing noise can be reduced.

In the gas turbine system (100) according to the present disclosure, the discharge ports (81b) are provided at a plurality of portions in a circumferential direction about the axis line (X1), the introduction ports (91a) are provided at a plurality of portions in the circumferential direction, and the discharge ports (81b) and the introduction ports (91a) are arranged at positions overlapping each other in the circumferential direction. Thus, a part of the mixed gas (Mx), in which the combustion gas (Gc) discharged from the discharge ports (81b) and the external air (Ex2) are mixed, is guided to the introduction unit (90) from the introduction ports (91a) arranged at positions circumferentially overlapping the discharge ports (81b).

The gas turbine system (100) according to the present disclosure includes a channel forming portion (76, 77) that covers the discharge port (81b) and the introduction port (91a) and forms a mixed gas channel (76a) through which the mixed gas flows between the channel forming portion and the surface of the shell (70). The combustion gas (Gc) flowing out of the plurality of discharge ports (81b) to the surface of the shell (70) flows through the mixed gas channel (76a) formed between the channel forming portion (76) and the surface of the shell (70). Since the mixed gas channel (76a) is a channel covered with the channel forming portion (76), external air flowing on the outer circumference side of the channel forming portion (76) with respect to the axis line X1 does not flow into the mixed gas channel (76a).

Thus, the flow amount of the external air (Ex2) to be mixed with the combustion gas (Gc) is restricted, and the temperature of the mixed gas (Mx) can be increased compared to a case where the channel forming portion (76) is not provided. Accordingly, the flow velocity difference between the mixed gas (Mx) and the combustion gas (Gc) mixed at the end of the nacelle (70) is smaller than in the case where the channel forming portion (76) is not provided, and the mixing noise is further reduced.

In the gas turbine system (100) according to the present disclosure, the channel forming portion (76) extends along the axis line (X1) and is formed in a cylindrical shape about the axis line (X1), and the mixed gas channel (76a) is a channel formed annularly about the axis line (X1). By mixing the combustion gas (Gc) with the external air (Ex2) in the annularly formed mixed gas channel (76a), it is possible to increase the temperature of the mixed gas (Mx) compared to the case where the channel forming portion (76) is not provided.

In the gas turbine system (100) according to the present disclosure, the channel forming portions (77) extend along the axis line (X1) and are spaced apart in a plurality of portions in the circumferential direction so as to cover both the discharge port (81b) and the introduction port (91a). The channel forming portions (77) are spaced apart in a discrete manner circumferentially about the axis line (X1). Thus, a region where the external air (Ex2) flows and a region where the mixed gas (Mx) flows are repeated alternately on the surface of the shell (70) along the circumferential direction. Since this facilitates mixing of the external air (Ex2) with the mixed gas (Mx) at each circumferential position, the flow velocity difference between the mixed gas (Mx) and the combustion gas (Gc) mixed at the end of the shell (70) is smaller, and therefore the mixing noise is further reduced.

The gas turbine system (100) according to the present disclosure includes a generator (40) coupled to the turbine (30) and configured to generate electric power by driving of the turbine (30) and supply electric power to a thrust generator (200) that generates thrust from electric power. According to the gas turbine system (100) of the present disclosure, the thrust generator (200) can be operated by electric power generated by the generator (40) in response to the driving of the turbine (30).

The moving body of each embodiment described above is understood as follows, for example.

The moving body (1) according to the present disclosure includes: the gas turbine system (100) according to any one of the above; and a thrust generator (200) that generates thrust from electric power generated by the gas turbine system (100).

According to the moving body (1) of the present disclosure, it is possible to effectively utilize thermal energy of the combustion gas (Gc) used in the driving of the turbine (30) to reduce mixing noise occurring when the combustion gas (Gc) and the external air (Ex2) are mixed.

REFERENCE SIGNS LIST 1 aircraft (moving body)
10 compressor
20 combustor
30 turbine
40 generator
60 exhaust unit
70 nacelle (shell)
76, 77 channel forming portion
78 intake portion
79 scoop portion
80 exit unit (heat exchange unit)
81 exit channel
81a intake port
81b discharge port
82 exit fan
90 introduction unit
91 introduction channel
91a introduction port
91b discharge port
92 introduction fan
100, 100A, 100B gas turbine system
200 electric fan
Ex1, Ex2 external air
Gc combustion gas
Mx mixed gas
S1 accommodation space
X1, X2, X3 axis line

The invention claimed is:

1. A gas turbine system comprising:
  a compressor configured to compress a first external air to generate a compressed air;
  a combustor configured to burn the compressed air together with a fuel to generate a combustion gas;
  a turbine configured to be driven by the combustion gas;
  an exhaust unit configured to guide the combustion gas that has passed through the turbine to an outside;
  a shell having a cylindrical shape and extending along an axis line about which the turbine is configured to rotate, and being arranged so as to cover the compressor, the combustor, the turbine, and the exhaust unit;
  a heat exchange unit configured to exchange a heat between the combustion gas that has passed through the turbine and a second external air on a surface of the shell, the heat exchange unit being configured to: (i) guide, to a plurality of discharge ports in the surface of the shell, the combustion gas that has passed through the turbine; and (ii) mix the combustion gas with the second external air to generate a mixed gas; and
  an introduction unit configured to guide the mixed gas to the exhaust unit from a plurality of introduction ports in the surface of the shell,
  wherein the discharge ports are defined in first portions, respectively, in a circumferential direction about the axis line,
  wherein the introduction ports are defined in second portions, respectively, in the circumferential direction, and
  wherein the discharge ports and the introduction ports are arranged at positions overlapping each other in the circumferential direction and aligned along the axis line and the shell is configured to guide the mixed gas to one of the introduction ports which is downstream of one of the discharge ports in a flow direction of the combustion gas and the second external air.

2. The gas turbine system according to claim 1, further comprising at least one channel forming portion that covers at least one of the discharge ports and at least one of the introduction ports and defines a mixed gas channel for flow of the mixed gas between the channel forming portion and the surface of the shell.

3. The gas turbine system according to claim 2,
  wherein the cylindrical shape of the shell is a first cylindrical shape,
  wherein the channel forming portion extends along the axis line and has a second cylindrical shape about the axis line, and
  wherein the mixed gas channel is defined annularly about the axis line.

4. The gas turbine system according to claim 2, wherein a plurality of the channel forming portions extends along the axis line and is spaced apart in the circumferential direction so as to cover both the discharge ports and the introduction ports.

5. The gas turbine system according to claim 1, further comprising a generator coupled to the turbine and configured to generate an electric power by driving of the turbine and supply the electric power to a thrust generator configured to generate a thrust from the electric power.

6. A movable body comprising:
  the gas turbine system according to claim 5; and
  the thrust generator.

* * * * *